United States Patent
Stickle et al.

(10) Patent No.: US 10,382,275 B1
(45) Date of Patent: *Aug. 13, 2019

(54) AUTOMATED INFRASTRUCTURE CONFIGURATION

(71) Applicant: Amazon Technologies, Inc., Seattle, WA (US)

(72) Inventors: Thomas Charles Stickle, Saint James, NY (US); Kevin James Wittkopf, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/873,349

(22) Filed: Jan. 17, 2018

Related U.S. Application Data

(63) Continuation of application No. 13/656,991, filed on Oct. 22, 2012.

(51) Int. Cl.
*G06F 9/54* (2006.01)
*H04L 12/24* (2006.01)

(52) U.S. Cl.
CPC .......... *H04L 41/0886* (2013.01); *G06F 9/547* (2013.01)

(58) Field of Classification Search
CPC ... G06F 9/547; G06F 15/177; H04L 41/0886; H04L 41/5054
USPC .......................................... 709/220; 717/106
See application file for complete search history.

(56) References Cited

U.S. PATENT DOCUMENTS

| | | | |
|---|---|---|---|
| 6,092,075 A | 7/2000 | Carey et al. | |
| 6,601,233 B1 | 7/2003 | Underwood | |
| 7,302,558 B2 | 11/2007 | Campbell et al. | |
| 7,496,233 B2 | 2/2009 | Kirihara et al. | |
| 7,596,615 B2* | 9/2009 | Satkunanathan | ... H04L 41/0806 700/79 |
| 7,668,942 B2 | 2/2010 | Tiwari et al. | |
| 7,853,945 B2* | 12/2010 | Kramer | ..................... G06F 8/63 709/203 |
| 7,950,010 B2* | 5/2011 | Goger | ....................... G06F 8/61 709/220 |
| 7,950,101 B2* | 5/2011 | Kim | ..................... B60S 1/4003 15/250.32 |

(Continued)

OTHER PUBLICATIONS

U.S. Appl. No. 13/656,991, "Advisory Action", dated Mar. 16, 2016, 3 pages.

(Continued)

*Primary Examiner* — Vivek Srivastava
*Assistant Examiner* — Binod J Kunwar
(74) *Attorney, Agent, or Firm* — Kilpatrick Townsend & Stockton LLP

(57) ABSTRACT

Embodiments of the present disclosure are directed to, among other things, performing automated configuration of infrastructure components associated with a software system. In some examples, configuration information associated with an infrastructure component of a software system may be received. Additionally, a set of instructions configured to enable configuration of the software system may be generated. Based at least in part on execution of the set of instructions, remote feedback associated with the software system may be received. Additionally, in some examples, the infrastructure component may be configured based at least in part on the received remote feedback.

20 Claims, 8 Drawing Sheets

(56) References Cited

U.S. PATENT DOCUMENTS

| | | | |
|---|---|---|---|
| 8,050,907 B2 | 11/2011 | Baisley et al. | |
| 8,244,696 B2* | 8/2012 | Salgar | G06F 8/71 |
| | | | 707/695 |
| 8,473,944 B2* | 6/2013 | Boss | G06F 9/44505 |
| | | | 717/121 |
| 8,627,309 B2* | 1/2014 | Scheidel | G06F 8/61 |
| | | | 717/172 |
| 8,813,065 B2* | 8/2014 | Zygmuntowicz | G06F 8/60 |
| | | | 717/120 |
| 8,904,341 B2 | 12/2014 | Wilcock et al. | |
| 8,959,477 B2* | 2/2015 | Mueller | G06F 9/44 |
| | | | 717/106 |
| 2002/0111934 A1* | 8/2002 | Narayan | G06F 9/548 |
| 2003/0200130 A1 | 10/2003 | Kall et al. | |
| 2004/0143470 A1 | 7/2004 | Myrick et al. | |
| 2005/0021348 A1 | 1/2005 | Chan et al. | |
| 2005/0021689 A1 | 1/2005 | Marvin et al. | |
| 2005/0055667 A1 | 3/2005 | Beringer et al. | |
| 2005/0257157 A1 | 11/2005 | Gilboa et al. | |
| 2005/0262196 A1 | 11/2005 | Mueller | |
| 2005/0262503 A1* | 11/2005 | Kane | G06F 8/61 |
| | | | 717/176 |
| 2006/0047798 A1 | 3/2006 | Feinleib et al. | |
| 2006/0190806 A1* | 8/2006 | Sasson | G06F 9/451 |
| | | | 715/202 |
| 2007/0157165 A1* | 7/2007 | Kim | G06F 8/36 |
| | | | 717/113 |
| 2007/0234345 A1* | 10/2007 | Kramer | G06F 8/61 |
| | | | 717/174 |
| 2008/0235611 A1* | 9/2008 | Fraley | G06F 9/44505 |
| | | | 715/772 |
| 2008/0263503 A1 | 10/2008 | Polly et al. | |
| 2008/0270973 A1* | 10/2008 | Edwards | G06Q 10/04 |
| | | | 717/104 |
| 2009/0006954 A1 | 1/2009 | Jackson et al. | |
| 2010/0180016 A1* | 7/2010 | Bugwadia | G06F 9/4411 |
| | | | 709/220 |
| 2010/0262558 A1 | 10/2010 | Edwards et al. | |
| 2011/0004564 A1 | 1/2011 | Rolia et al. | |
| 2011/0004565 A1* | 1/2011 | Stephenson | G06Q 10/06 |
| | | | 705/348 |
| 2011/0093570 A1 | 4/2011 | Mackin et al. | |
| 2011/0258579 A1 | 10/2011 | Nanjundaswamy et al. | |
| 2012/0030094 A1* | 2/2012 | Khalil | G06Q 10/06 |
| | | | 705/39 |
| 2014/0101635 A1 | 4/2014 | Hoffmann | |
| 2014/0298260 A1 | 10/2014 | Abowd et al. | |

OTHER PUBLICATIONS

U.S. Appl. No. 13/656,991 , "Final Office Action", dated Oct. 6, 2015, 40 pages.
U.S. Appl. No. 13/656,991 , "Final Office Action", dated Jul. 7, 2017, 47 pages.
U.S. Appl. No. 13/656,991 , "Non-Final Office Action", dated Aug. 28, 2014, 18 pages.
U.S. Appl. No. 13/656,991 , "Non-Final Office Action", dated Mar. 19, 2015, 29 pages.
U.S. Appl. No. 13/656,991 , "Non-Final Office Action", dated Nov. 17, 2016, 38 pages.
U.S. Appl. No. 13/656,991, filed Oct. 22, 2012, Titled: Automated Infrastructure Configuration.

* cited by examiner

AUTOMATED INFRASTRUCTURE CONFIGURATION

CROSS REFERENCE TO RELATED APPLICATIONS

This application is a continuation of U.S. application Ser. No. 13/656,991, filed Oct. 22, 2012, and entitled "AUTOMATED INFRASTRUCTURE CONFIGURATION", the contents of which are herein incorporated in its in entirety.

BACKGROUND

As more and more content becomes available upon the Internet, exceedingly large numbers of users go to the web for all types of resources. For example, users may access the Internet for sources of entertainment as well as consumption of news items or other information. Additionally, companies and other entities may now access the Internet as a source of products for operating their businesses. As such, cloud computing has begun to replace traditional methods of software acquisition. For example, some services may provide enterprise solutions or other software applications over the web in such a way that the users of these solutions need not download and/or install any code. However, such concepts may provide considerable challenges for both the service provider and the entity wishing to utilize the services or solutions.

BRIEF DESCRIPTION OF THE DRAWINGS

Various embodiments in accordance with the present disclosure will be described with reference to the drawings, in which.

DETAILED DESCRIPTION

Figure 1:
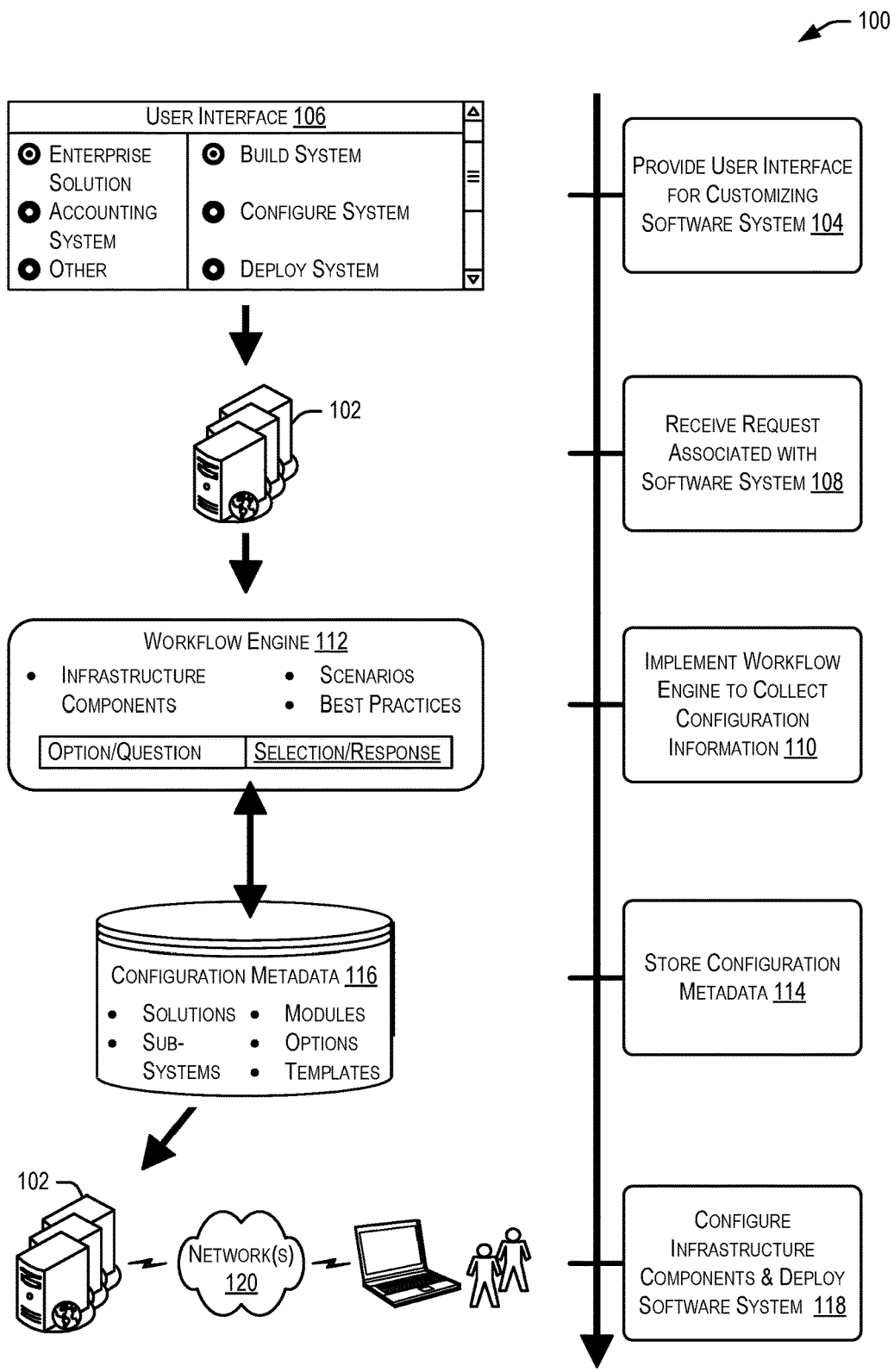
FIG. 1 illustrates an example flow for implementing automated infrastructure configuration, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing automated infrastructure configuration for one or more software systems. For example, software systems may include enterprise solutions (e.g., software packages designed to support business processes, reporting, data flows, analytics, etc.), accounting solutions, office suites, graphics solutions, reference architectures, and/or any other type of application software. Additionally, as used herein, infrastructure components may include any essential or non-essential components that may be utilized alone or in conjunction with other components to form a software system. Examples of infrastructure components may include, but are not limited to, databases, application servers, web servers, identity (ID) servers, management servers, threat protection devices, machine instances, data centers, etc. As such, the present disclosure may be directed to, among other things, providing automated configuration, setup, and/or deployment of software systems by enabling automated configuration of infrastructure components.

Once configured and/or pieced together, the infrastructure components may be deployed to implement the software system for a remote computing device. In this way, the software system may be provided by a service provider or a configuration service and may not reside locally on the remote computing device. In some examples, instructions associated with configuring, deploying, implementing, and/or operating the software system may be processed by such providers as a service (e.g., as a cloud-based enterprise software solution). However, in other examples, the present disclosure may provide automated configuration of such infrastructure components, while the remote computing devices themselves may process instructions for implementing the software systems.

In some examples, deployment of the one or more infrastructure components and/or software systems may be enabled by utilizing one or more application programming interfaces (APIs). For example, each component may be deployed or implemented by a separate API and/or APIs may be utilized to deploy or implement the entire software system once configured. In this way, the entire process of configuring, constructing, and deploying software systems may be automated. Additionally, in some examples, deployment may include the execution of instructions configured to install and/or activate software (including, but not limited to, compiling, installation, execution, etc.), while implementation may include the execution of instructions for processing data once the software has been activated and is operating.

In some aspects, a knowledge base, database, or other aggregation of best practice data may be stored, collected, and/or utilized to implement the automated infrastructure configuration. For example, best practice information (e.g., metadata) associated with configuring an enterprise system may be collected and utilized to inform or otherwise enable recommendations to be provided during a configuration stage. Additionally, a workflow or engine or state machine may be generated or otherwise implemented to perform the automated infrastructure configuration. For example, a user may be guided through the configuration stage via the workflow engine (and/or utilizing a user interface (UI)) and, in some cases, the workflow engine may utilize the best practice metadata to provide questions, recommendations, and/or options. In this way, based at least in part on answers and/or selections provided by the configuring users, the workflow engine may be able to automatically configure the infrastructure components for the user. From this configuration information, the workflow engine may be able to organize, configure, and/or deploy the enterprise system on behalf of the user. In some cases, human interaction may be minimized and the workflow engine may be configured to make intelligent assumptions about the system implementation based at least in part on best practices.

The workflow engine may, in some instances, be rules based. That is, best practice metadata and/or rules may be utilized to walk a user through the configuration of the software system. In some aspects, a user's answer to a question or selection of an option may determine the next question, set of questions, recommendation, and/or option selection for the workflow engine to provide. In this way, a user may define one or more scenarios, subsystems, modules, and/or module options to be implemented by the software system product being configured (i.e., the software solution being configured). At the completion of the configuration process, the workflow engine may be capable of piecing together a complete set of deployment templates that can be utilized to build and/or deploy the software system. Pre-existing artifacts such as, but not limited to, machine images and/or disk volumes may be utilized to build and/or deploy the configured system. In some examples, a template may be generated that describes the execution of the artifacts. This template may be stored in persistent memory.

FIG. 1 depicts an illustrative flow 100 in which techniques for automatic infrastructure configuration may be implemented. These techniques are described in more detail below in connection with FIGS. 2-7. Returning to FIG. 1, in illustrative flow 100, operations may be performed by one or more processors of one or more infrastructure configuration computers 102. Additionally, instructions for performing the operations may be stored in one or more memories of the infrastructure configuration computers 102. As desired, the flow 100 may begin at 104, where a UI 106 may be provided for customizing a software system. In one non-limiting example, the UI 106 may be provided to a user via a remote computing device. Additionally, by way of example only, the UI 106 may provide options for different types of systems to configure, build, and/or deploy. For example, the UI 106 may allow a user to select between configuring an enterprise solution, an accounting system, a document management system, a web site, or the like. Additionally, as noted, the UI 106 may provide a build option, a configure option, a deploy option, or any other option as desired for implementing the features described herein.

In some examples, at 108, the infrastructure configuration computers 102 may receive a request associated with the software system to be built, configured, or deployed. In some aspects, the request may be based at least in part on the user's selection or selections via the UI 106. For example, if the user selects to configure an enterprise solution, the request received at 108 may be a request to configure an enterprise solution. At 110, the infrastructure configuration computers 102 may be configured to implement a workflow engine 112 or state machine configured to collect configuration information associated with the software system selected at 104. In some examples, the workflow engine 112 may be configured to manage infrastructure components, scenarios, subsystems, best practice metadata, as well as rules for implementing a rules-based workflow or state machine. For example, the workflow engine 112 may provide configuration questions, recommendations, and/or configuration options based at least in part on the best practice metadata. For example, if a user selects a solution (e.g., an enterprise product) and/or a scenario (e.g., to configure the enterprise product) that includes a database, the workflow engine 112 may ask the user which type of database would be preferred and/or what software should be utilized to operate the database. These questions, recommendations, and/or options may be determined based at least in part on the best practice information and/or other metadata. In some aspects, the user may provide a response by selecting an option or otherwise answering the question. In some cases, the user may create a user-defined answer and the workflow engine may be extensible enough to handle responses that are not found within the rules and/or metadata.

At 114, the infrastructure configuration computers 102 may store the configuration information in a data store 116. In some examples, the data store 116 may maintain configuration metadata including, but not limited to, solution configuration metadata, subsystem configuration metadata, module configuration metadata, options metadata, best practice metadata, template metadata, or the like. In some examples, solution configuration metadata may include, but is not limited to, a selection of solution definitions that may be utilized to drive the workflow engine 112. As such, solution definitions, that may include one or more scenarios and/or scenario metadata, may be defined such that the workflow engine 112 can guide a user through selection of a solution and/or configuration of a particular implementation scenario associated with the selected solution. For example, a user may request to build and/or configure a web-based document management application (i.e., a solution) and the solution metadata associated with such application may be utilized to select or otherwise acquire an appropriate solution definition. Based at least in part on this definition, the workflow engine 112 may be able to access appropriate metadata for enabling the user to configure the solution.

In some aspects, the metadata may be utilized by the workflow engine 112 as the user configures the software system. However, this metadata may also be utilized by the infrastructure configuration computers 102 to configure the infrastructure components and/or deploy the software system at 118. For example, the configuration metadata may be utilized by the workflow engine while the user is still configuring the system. However, in other examples, once the user has finished entering configuration information, the computers 102 may utilize the metadata to actually configure the infrastructure components. In other words, one or more templates may be generated and/or one or more APIs may be implemented utilizing the configuration metadata (i.e., configuring the components rather than collecting configuration information). Further, once configured, the computers 102 may deploy the software system utilizing this same or similar data. Once deployed, the computers 102 may implement or otherwise process instructions associated with deployed software system such that the users may utilize the software system remotely via one or more networks 120.

Figure 2:
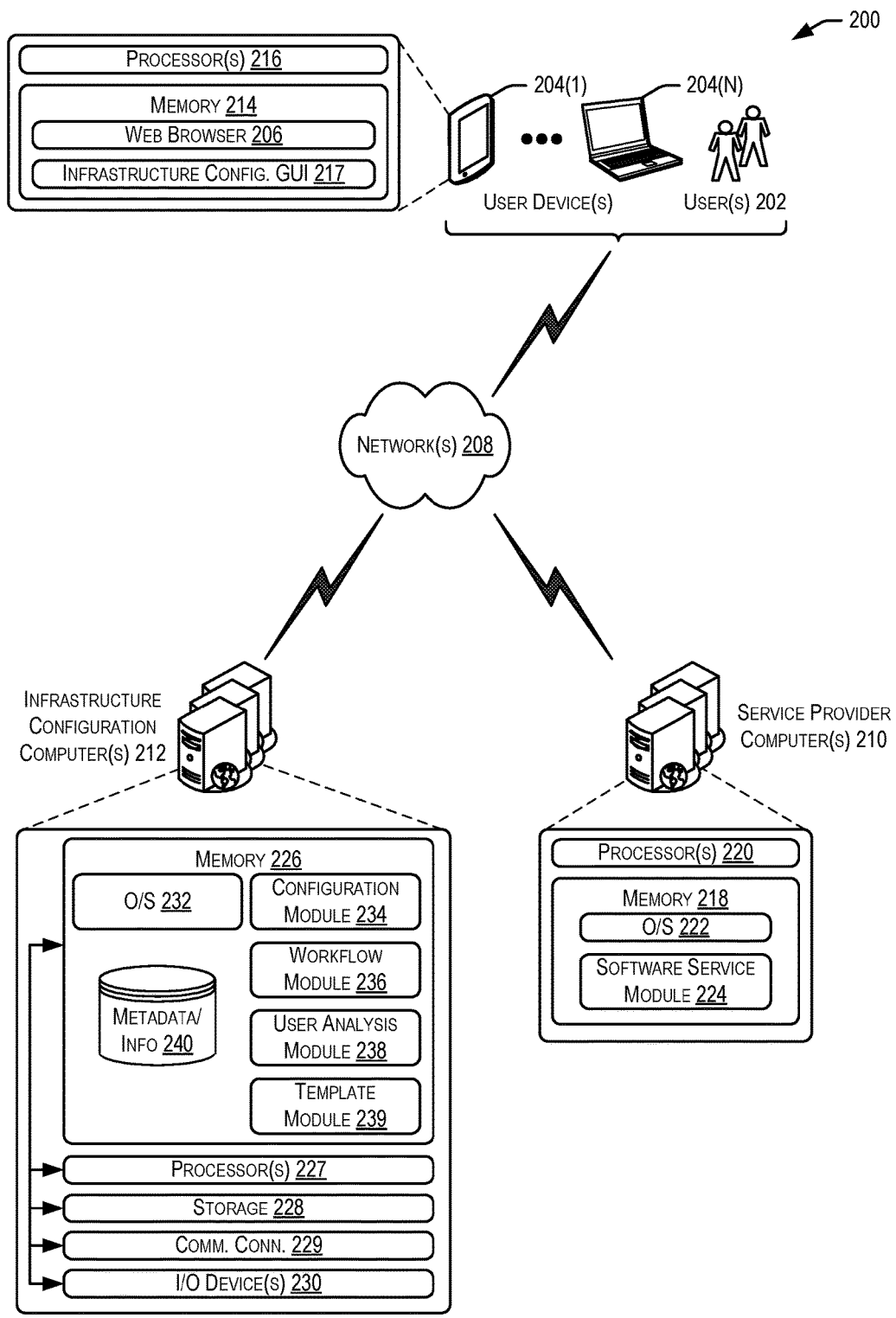
FIG. 2 illustrates an example architecture for implementing the automated infrastructure configuration described herein that includes an infrastructure configuration computers, service provider computers, and/or one or more user devices connected via one or more networks, according to at least one example.

FIG. 2 depicts an illustrative system or architecture 200 in which techniques for automated infrastructure configuration may be implemented. In architecture 200, one or more users 202 (i.e., account holders or web browser users) may utilize user computing devices 204(1)-(N) (collectively, user devices 204) to access a web browser application 206, or a user account accessible through the web browser application 206, via one or more networks 208. In some aspects, the web browser application 206 and/or user account may be hosted, managed, and/or provided by a computing resources service or service provider, such as by utilizing one or more service provider computers 210 and/or one or more infrastructure configuration computers 212. The one or more service provider computers 210 may, in some examples, provide computing resources such as, but not limited to, client entities, low latency data storage, durable data storage, data access, management, virtualization, cloud-based software solutions, etc. In some aspects, a client entity may be deployed and/or managed virtually and/or data volumes may be stored virtually within a distributed computing system operated by the one or more service provider computers 210. The one or more service provider computers 210 may also be operable to provide web hosting, computer application development, and/or implementation platforms, combinations of the foregoing, or the like to the one or more users 202. The one or more infrastructure configuration computers 212, in some examples, may provide browsing history management and/or browsing history statistics as a third-party service to the service provider computers 210. However, in some examples, the infrastructure configuration computers 212 may be fully integrated with the service provider computers 210 such that they are controlled, managed, or otherwise operated together and/or by the same entity.

In some examples, the networks 208 may include any one or a combination of many different types of networks, such as cable networks, the Internet, wireless networks, cellular networks and other private and/or public networks. While the illustrated example represents the users 202 accessing the web browser application 206 over the networks 208, the described techniques may equally apply in instances where the users 202 interact with a service provider computer 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the web browser application 206 may allow the users 202 to interact with a service provider computer 210, such as to access web content (e.g., web pages, music, video, etc.) and/or software systems (e.g., enterprise solutions, etc.). The one or more service provider computers 210, perhaps arranged in a cluster of servers or as a server farm, may host the web browser application 206 and/or cloud-based software services. Other server architectures may also be used to host the web browser application 206 and/or cloud-based software services. The web browser application 206 may be capable of handling requests from many users 202 and serving, in response, various user interfaces that can be rendered at the user devices 204 such as, but not limited to the infrastructure configuration GUI 217. The web browser application 206 can provide any type of website that supports user interaction, including social networking sites, online retailers, informational sites, blog sites, search engine sites, news and entertainment sites and so forth. As discussed above, the described techniques can similarly be implemented outside of the web browser application 206, such as with other applications running on the user devices 204.

As noted above, the architecture 200 may include one or more user devices 204. The user devices 204 may be any type of computing device such as, but not limited to, a mobile phone, a smart phone, a personal digital assistant (PDA), a laptop computer, a desktop computer, a thin-client device, a tablet PC, etc. In some examples, the user devices 204 may be in communication with the service provider computers 210 and/or the infrastructure configuration computers 212 via the networks 208, or via other network connections. While the following description may regularly refer to interaction between the user devices 204 and the service provider computers 210, it is to be understood that any communication to or from the user devices 204 may be via either (or both) of the service provider computers 210 or the infrastructure configuration computers 212.

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein including at least the infrastructure configuration graphical user interface (GUI) 117, such as web browsers or dedicated applications (e.g., smart phone applications, tablet applications, etc.) and/or the web browser application 206. The infrastructure configuration GUI 217 may be configured to receive, store and/or display a website or other interface for interacting with the service provider computers 210 and/or the infrastructure configuration computers 212. Additionally, the memory 214 may store access credentials and/or other user information such as, but not limited to, user IDs, passwords and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

Additionally, in some aspects, the infrastructure configuration GUI 217 may allow a user 202 to interact with the infrastructure configuration computers 212 and/or a workflow engine of the infrastructure configuration computers 212. As such, the infrastructure configuration GUI 217 may be utilized by the user 202 to build, configure, and/or deploy one or more software systems. As such, the infrastructure configuration GUI 217 may be configured to receive data entry from the users 202 and provide responses to the service provider computers 210 and/or the infrastructure configuration computers 212. If the latter, this information may be utilized by the infrastructure configuration computers 212 to perform the automated infrastructure configuration described herein. Additionally, as noted, the service provider computers 210 and the infrastructure configuration computers 212 may be integrated into a single computing system (e.g., a distributed system).

In some aspects, the service provider computers 210 may also be any type of computing devices such as, but not limited to, mobile, desktop, thin-client and/or cloud computing devices, such as servers. In some examples, the service provider computers 210 may be in communication with the user devices 204 and/or the infrastructure configuration computers 212 via the networks 208, or via other network connections. The service provider computers 210 may include one or more servers, perhaps arranged in a cluster, as a server farm, or as individual servers not associated with one another. These servers may be configured to host a website (or combination of websites) viewable via the user devices 204 or a web browser accessible by a user 202. Additionally, in some aspects, the service provider computers 210 may be configured to perform infrastructure component configuration as part of an integrated, distributed computing environment.

In one illustrative configuration, the service provider computers 210 may include at least one memory 218 and one or more processing units (or processor(s)) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described.

The memory 218 may store program instructions that are loadable and executable on the processor(s) 220, as well as data generated during the execution of these programs. Depending on the configuration and type of service provider computers 210, the memory 218 may be volatile (such as RAM) and/or non-volatile (such as ROM, flash memory, etc.). The service provider computers 210 or servers may also include additional storage, which may include removable storage and/or non-removable storage. The additional storage may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM or ROM.

The memory 218 and the additional storage, both removable and non-removable, are all examples of computer-readable storage media. Additional types of computer storage media that may be present in the service provider computers 210 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 210. Combinations of any of the above should also be included within the scope of computer-readable storage media.

The service provider computers 210 may also contain communications connection(s) that allow the service provider computers 210 to communicate with a stored database, another computing device or server, user terminals and/or other devices on the networks 208. The service provider computers 210 may also include input/output (I/O) device(s), such as a keyboard, a mouse, a pen, a voice input device, a touch input device, a display, speakers, a printer, etc.

Turning to the contents of the memory 218 in more detail, the memory 218 may include an operating system 222 and one or more application programs or services for implementing the features disclosed herein including a software service module 224. The software service module 224 may be configured to provide one or more software configuration and/or deployment services.

Additionally, in some aspects, the infrastructure configuration computers 212 may also be any type of computing devices such as, but not limited to, mobile, desktop, thin-client and/or cloud computing devices, such as servers. In some examples, the infrastructure configuration computers 212 may be in communication with the user devices 204 and/or the service provider computers 210 via the networks 208, or via other network connections. The infrastructure configuration computers 212 may include one or more servers, perhaps arranged in a cluster, as a server farm, or as individual servers not associated with one another. These servers may be configured to perform automated infrastructure component configuration as part of an integrated, distributed computing environment.

In one illustrative configuration, the infrastructure configuration computers 212 may include at least one memory 226 and one or more processing units (or processor(s)) 227. The processor(s) 227 may be implemented as appropriate in hardware, computer-executable instructions, firmware, or combinations thereof. Computer-executable instruction or firmware implementations of the processor(s) 227 may include computer-executable or machine-executable instructions written in any suitable programming language to perform the various functions described.

The memory 226 may store program instructions that are loadable and executable on the processor(s) 227, as well as data generated during the execution of these programs. Depending on the configuration and type of infrastructure configuration computers 212, the memory 226 may be volatile (such as RAM) and/or non-volatile (such as ROM, flash memory, etc.). The infrastructure configuration computers 212 or servers may also include additional storage 228, which may include removable storage and/or non-removable storage. The additional storage 228 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 226 may include multiple different types of memory, such as SRAM, DRAM, or ROM.

The memory 226, the additional storage 228, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 226 and the additional storage 228 are all examples of computer storage media. Additional types of computer storage media that may be present in the infrastructure configuration computers 212 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the infrastructure configuration computers 212. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The infrastructure configuration computers 212 may also contain communications connection(s) 229 that allow the infrastructure configuration computers 212 to communicate with a stored database, another computing device or server, user terminals and/or other devices on the networks 208. The infrastructure configuration computers 212 may also include I/O device(s) 230, such as a keyboard, a mouse, a pen, a voice input device, a touch input device, a display, speakers, a printer, etc.

Turning to the contents of the memory 226 in more detail, the memory 226 may include an operating system 232, one or more data stores, and/or one or more application programs or services for implementing the features disclosed herein including a configuration module 234, a workflow module 236, and/or a user analysis module 238. The one or more data stores may include a metadata and/or information data store 240 configured to store metadata and/or other information associated with best practices and/or configuration settings. The configuration module 234 may, in some examples, be configured to monitor network activity between the user devices 204 (e.g., the web browser 206 and/or the infrastructure configuration GUI 217) and the service provider computers 210 (e.g., the software service module 224). For example, the configuration module 234 may monitor data transmitted from the infrastructure configuration GUI 217 to the software service module 224 (e.g., configuration data associated with setting up, configuring, and/or deploying the software system). The configuration module 234 may also be configured to mediate between the user devices 204 and the workflow module 236. In other words, workflow questions, recommendations, and/or options may be provided to the user devices (e.g., for display via the infrastructure configuration GUI 217) from the configuration module 234. Additionally, the configuration module 234 may receive responses and/or selections from the user devices 204 to be provided to the workflow module 236. Further, in some aspects, the configuration module 234 may enable the workflow module 236 based at least in part on receipt of a request to build, configure, or deploy a software system. In some examples, this monitored and/or received information may be stored in the metadata/information data store 240.

In some examples, the workflow module 236 may be configured to process the information received by the configuration module 234 in order to configure a software system. In some examples, the workflow module 236 may be further configured to follow rules (e.g., stored in the metadata/information data store 240) and guide users 202 in the specification of a complete system architecture (or portions of system architectures). In some cases, the workflow module 236 may accomplish this by allowing users 202 to define scenarios, subsystems, modules, and/or module options that are to be used by the system. For example, a user 202 may be provided with one or more scenario selections (e.g., enterprise solution, payroll system, etc.). Based at least in part on the selection, the workflow module 236 (otherwise referred to as a workflow engine) may follow rules stored in the metadata/information data store 240 to determine one or more subsystem selection options and/or recommendations to provide to the user 202.

As noted, subsystem selection options (i.e., infrastructure components that may be included in the scenario) may include, but are not limited to, databases, application servers, web servers, ID servers, management servers, threat protection systems, etc. Further, for each selected (or user-defined) subsystem, the workflow module 236 may utilize the rules to determine one or more modules for configuring each subsystem. Module choices may include, but are not limited to, ID information, name information, description information, operating system information, dependency information (e.g., which modules depend from which), etc. Once modules are selected, the user 202 may also configure options for each module. In some examples, each software system may be made up of or defined by an aggregation of subsystems (each of which may include one or more modules and/or module options). As such, in some aspects, once the configuration process is complete (i.e., the user 202 has answered questions or otherwise responded to selection requests), the workflow module 236 may piece together a complete set of deployment templates that can be utilized to deploy the system based at least in part on the collected responses.

Additionally, in some examples, the user analysis module 238 may be configured to analyze a user device 204 to determine appropriate software system, scenario, subsystem, module, and/or module option recommendations to make. For example, the user analysis module 238 may analyze the systems running on physical hardware of the user device 204 and, based at least in part on this analysis, may inform the workflow engine as to which set of rules to follow. From that starting point, the workflow module 236 may be able to collect data from the user 202, make determinations about subsystems and/or modules, and build the process (i.e., configure template files for deploying the software system). Further, in some examples, the template module 239 may be configured to implement one or more resource formation template. Resource formation templates may, in some examples, be utilized to describe resources, resource configuration information, and/or resource deployment information (e.g., appropriate APIs) in a template-style form. For example, the present disclosure may be configured to implement artifacts or other resources available via web services in a cloud environment utilizing one or more templates. The templates may allow for consistent formation and/or aggregation of resources to be included one or more solutions (individually or in combination).

A few additional examples of the operations of the infrastructure configuration computers 212 and/or the service provider computers 210 are also described in greater detail below with reference to FIGS. 3-7.

Figure 3:
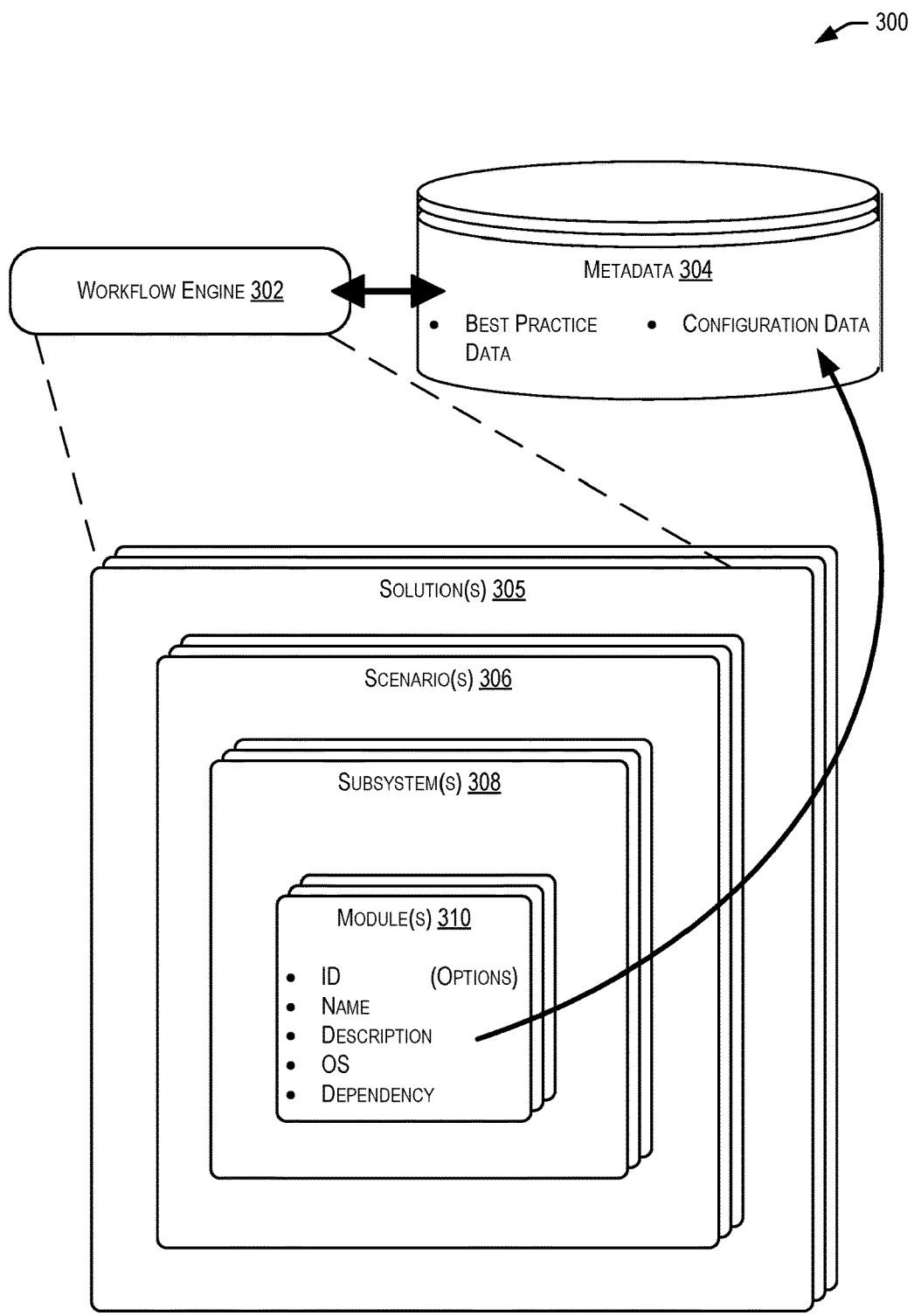
FIG. 3 illustrates an example block diagram for describing features of the automated infrastructure configuration described herein, according to at least one example.

FIG. 3 depicts an example block diagram 300, for describing techniques and/or features of the automated infrastructure component configuration described herein. In some examples, a workflow engine 302 (much like the workflow module 236 of FIG. 2) may interact with a metadata data store 304 for configuring a software system. As shown in FIG. 3, the workflow engine may guide a user through selection and/or configuration of one or more solutions 305 and/or scenarios 306 associated with particular solutions 305 by utilizing the best practice metadata stored in the metadata data store 304. Additionally, when configuration decisions are made by the user, that data may be included in the metadata data store (e.g., configuration data) and utilized for configuration and/or deployment of the system. Example scenarios include enterprise solutions, document management systems, payroll systems, or any other software application that includes one or more infrastructure components (such as, but not limited to, a database, an application server, a web server, an ID server, or the like). In some aspects, the metadata for subsystems, modules, etc., as well as the best practice data may be stored as a declarative file (e.g., in a JavaScript Object Notation (JSON) formatted file). Additionally, this file and/or the metadata in general may be static and/or may be utilized to guide the rules engine (i.e., the workflow engine 304).

In some examples, a solution 305 may include any software application package or collection of services that may be built for a user or entity. For each possible solution 305, there may be one or more possible scenarios 306 that may define types, styles, or other variations for implementing the solution 305. In some aspects, each scenario 306 may be made up of one or more subsystems 308 (also referred to as infrastructure components). Based at least in part on user selection via the workflow engine 302, a user may automatically generate scenarios with appropriate subsystems. Additionally, in some examples, each subsystem 308 may include one or more modules 310. Machine images and scripts, which can be executed at runtime, may be considered building blocks for each scenario 306 and/or for the software system being built. Further, in some examples, these artifacts may be pre-existing and/or available in a cloud environment. A template describing the execution of these artifacts may then be generated for each artifact and placed into persistent storage (e.g., the metadata data store 304 or some other storage device). In some aspects, the modules 310 may represent a collection of virtual machines and deployment metadata (based at least in part on the templates), as described briefly above with reference to the template module 239 of FIG. 2.

In some examples, the metadata describing a module 310 may include an ID, a name, a description, the supported OS, and any modules that it may depend on. Modules 310 may also include module options (e.g., configuration settings associated with operation of each module). Additionally, modules 310 can then be organized into a collection of subsystems 308 which may group modules 310 logically into an application tier. For example, a database subsystem may allow for the following modules:
SQL Server 2008 PostgreSQL
SQL Server 2012 RDS/MySQL
Oracle DB RDS/Oracle
MySQL RDS/SQL Server In some examples, if the user were to select SQL Server 2008, the workflow engine 302 may ask the user if they want to setup database mirroring and/or deploy a witness which may act as a dependent module. Modules 310 may also have groupings of options and if the SQL Server is selected, the workflow engine 302 may ask for a size of the default database and/or whether the user would like the SQL Server to join an Active Directory Domain, among other possible configuration questions. Subsystems 308 may then be organized into a higher order grouping (e.g., a scenario). In one non-limiting example, a scenario may include a mobile application and some subsystems may include administration, web, application, database, identity, etc. Further, in some cases, at the conclusion of transitioning through the workflow engine 302 process, the system may generate a single artifact based at least in part on the collection of modules 310 that were selected, and a set of instructions may be baked into the artifact (i.e., to instruct the module configuration options).

FIGS. 4-7 illustrate example flow diagrams showing respective processes 400-700 for performing automated infrastructure configuration, according to at least a few examples. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 4:
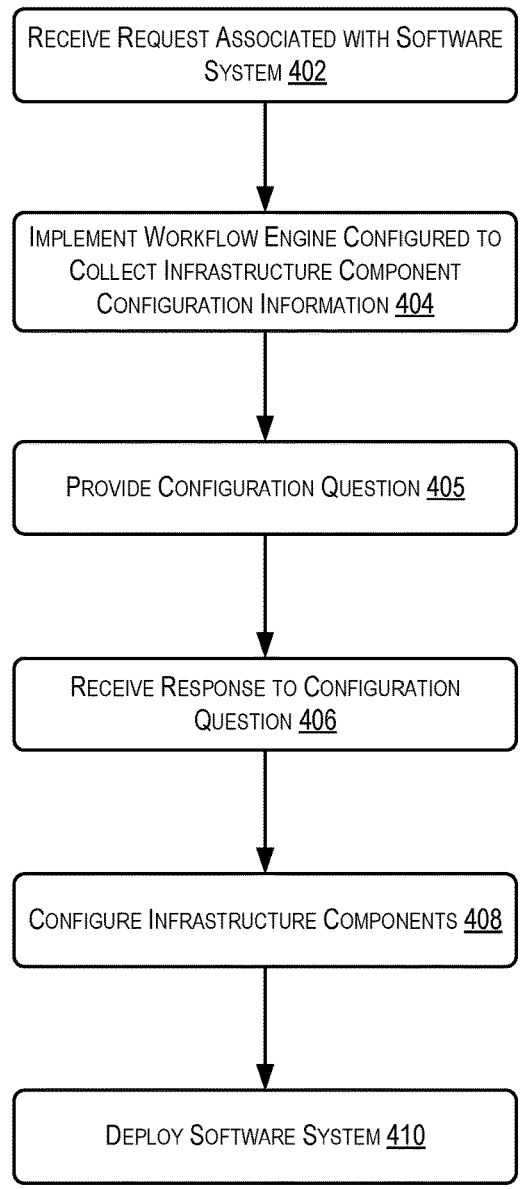
FIG. 4 illustrates an example flow diagram of a process for implementing the automated infrastructure configuration described herein, according to at least one example.

In some examples, the one or more infrastructure configuration computers 212 (e.g., utilizing at least one of the configuration module 234 and/or the workflow module 236) shown in FIG. 2 may perform the process 400 of FIG. 4. The process 400 may begin at 402 by including receipt of a request associated with a software system to be configured. In some aspects, the software system may be an enterprise solution or other application software comprised of one or more infrastructure components. The enterprise system or other application software system may be implemented by one or more APIs (e.g., the system may be a cloud or virtual system that is operated by a remote computing device such as, but not limited to, a service provider that provides the software system.

At 404, the process 400 may include implementing a workflow engine configured to collect infrastructure component configuration information. This information may be received by a remote computing device such as, but not limited to, a user device or other client instance (such as a virtual machine instance operating on behalf of a user or client entity). Additionally, in some aspects, implementing the workflow engine may include providing one or more configuration questions at 405 and/or receiving responses to the configuration questions at 406. In some aspects, providing configuration questions at 405 may include providing options for selection, providing recommendations, and/or providing a user the ability to enter user-defined suggestions or requests. In other words, the question may actually be an interface for allowing a user to provide feedback or other configuration information. Additionally, receiving the response at 406 should not be limited to receiving an answer to the question; but should be construed to include any feedback or input that a user may enter to configure the software system.

At 408, the process 400 may include configuring the components. In some examples, configuring the components may include generating one or more deployment templates. The templates may include APIs and/or instructions for utilizing pre-existing artifacts (e.g., machine images, disk volumes, or the like). Further, in some examples, the process 400 may end at 410 where the process 400 may include deploying the software system. In some aspects, implementation of the workflow engine may be based at least in part on a type of enterprise system associated with the request. For example, for each different type of software system to be configured, a different set of instructions may be executed by the workflow engine. In some aspects, the first question or set of questions may be followed up with a second question or a second set of questions, based at least in part on the first response or set of responses. Additionally, infrastructure components may include, but are not limited to, databases, application servers, web servers, identity servers, management servers, or threat protection systems.

Figure 5:
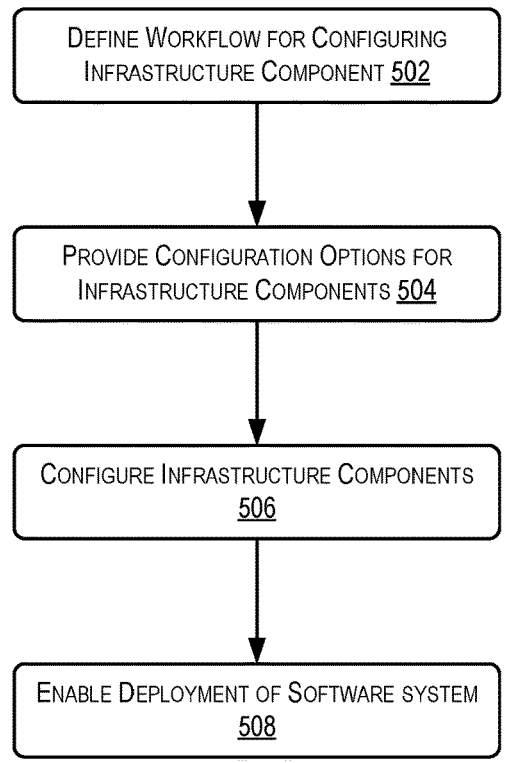
FIG. 5 illustrates another example flow diagram of a process for implementing the automated infrastructure configuration described herein, according to at least one example.

FIG. 5 illustrates an example flow diagram showing process 500 for performing automated infrastructure configuration, according to at least a few examples. The one or more infrastructure configuration computers 212 (e.g., utilizing at least one of the configuration module 234 and/or the workflow module 236) shown in FIG. 2 may perform the process 500 of FIG. 5. The process 500 may begin at 502 by including definition of a workflow for configuring infrastructure components. In some examples, one or more solution definitions may be defined based at least in part on known scenarios and/or user input (e.g., via the workflow engine), and such defined solution definitions may then be utilized to implement the solution once configuration is complete. The workflow may be a state machine or any other engine or processing capable of following rules and processing operations in a designated order. In some aspects, the workflow may be generated based at least in part on a user input received via a UI. Additionally, the infrastructure components may be associated with an enterprise solution hosted by a first computer, remote from a user computing device. At 504, the process 500 may include providing configuration options for infrastructure components. These options may be in the form of selections, questions, or the like and may be provided to a remote computing device via the UI. In some examples, the process 500 may also include configuring the infrastructure components at 506. As noted above, configuring the infrastructure components may include generating one or more templates associated with computing artifacts configured to implement the software system. The process 500 may end at 508, where the process 500 may include enabling deployment of the software system via one or more APIs.

Figure 6:
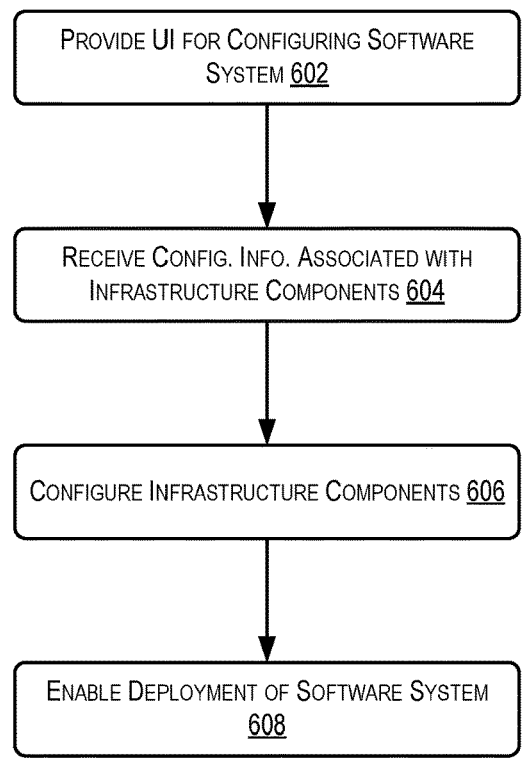
FIG. 6 illustrates another example flow diagram of a process for implementing the automated infrastructure configuration described herein, according to at least one example.

FIG. 6 illustrates an example flow diagram showing process 600 for performing automated infrastructure configuration, according to at least a few examples. The one or more infrastructure configuration computers 212 (e.g., utilizing at least one of the configuration module 234 and/or the workflow module 236) shown in FIG. 2 may perform the process 600 of FIG. 6. The process 600 may begin at 602 by including providing, to a user, a UI for configuring a software system. The UI may include build, configure, and/or deploy options. Additionally, utilizing a workflow engine or state machine, the UI may present questions, options, and/or recommendations to the user to guide the user through configuring the software system. At 604, the process 600 may include receiving configuration information associated with infrastructure components of the system being configured. In other words, the configuration information may be received via the UI. The process 600 may also include configuring the infrastructure components at 606. Further, in some examples, the process 600 may end at 608, where the process may include enabling deployment of the software system (including, for example, deployment of an enterprise system).

Figure 7:
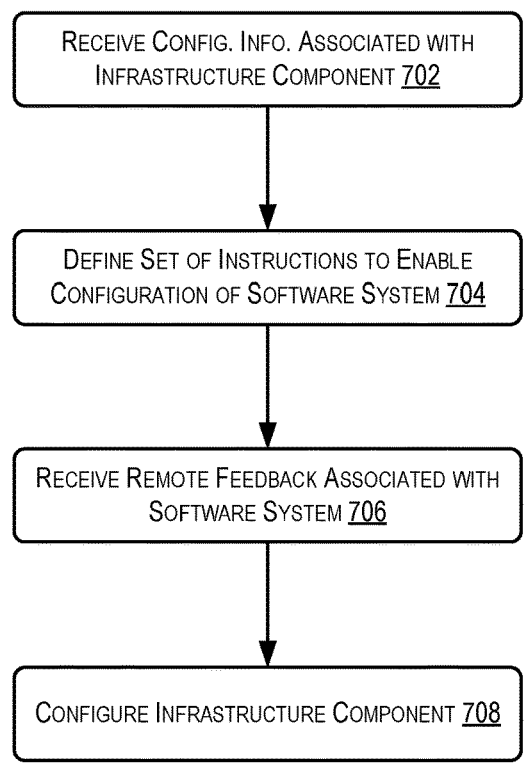
FIG. 7 illustrates another example flow diagram of a process for implementing the automated infrastructure configuration described herein, according to at least one example.

FIG. 7 illustrates an example flow diagram showing process 700 for performing automated infrastructure configuration, according to at least a few examples. The one or more infrastructure configuration computers 212 (e.g., utilizing at least one of the configuration module 234 and/or the workflow module 236) shown in FIG. 2 may perform the process 700 of FIG. 7. The process 700 may begin at 702 by including receiving configuration information associated with infrastructure components. The infrastructure components may include, but are not limited to, databases, application servers, web servers, identity servers, management servers, or threat protection systems. These infrastructure components may be the building blocks of a complete software system such as an enterprise solution. At 704, the process 700 may include generating a set of instructions to enable configuration of the software system. For example, the set of instructions may include instructions for implementing a workflow engine or state machine.

In some examples, the workflow engine and/or state machine may be rules-based and may follow best practices. The best practice information, in some examples, may be collected over time based at least in part on historical user data, data associated with other configuration processes (e.g., previous scenario settings of previous users utilizing the features of the present disclosure), and/or based at least in part on other administrator or user input. For example, the best practice data may be regularly or periodically updated with new best practice information that is collected via use of the present features. In other words, each workflow engine may rely on new or updated best practice information collected from a previous workflow engine. At 706, the process 700 may include receiving remote feedback associated with the software system. For example, utilizing the UI, a user may answer questions, make selections, or otherwise provide configuration information (e.g., configuration information that may not match current options or configuration settings). Further, the process 700 may end at 708, where the process 700 may include configuring infrastructure components.

Illustrative methods and systems for performing automated infrastructure configuration are described above. Some or all of these systems and methods may, but need not, be implemented at least partially by architectures such as those shown at least in FIGS. 2-7 above.

Figure 8:
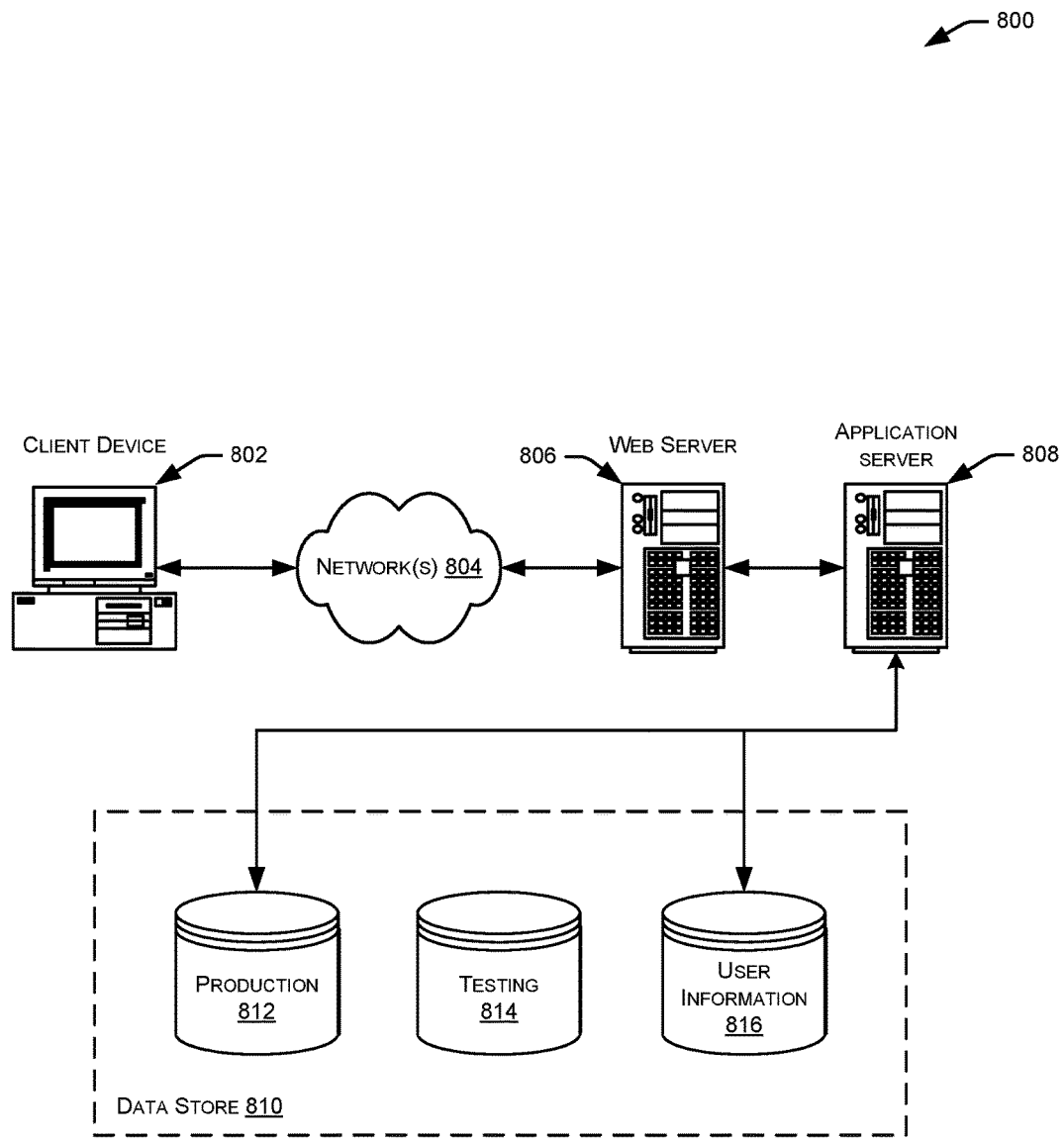
FIG. 8 illustrates an environment in which various embodiments of the automated infrastructure configuration described herein can be implemented, according to at least one example.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method comprising:
   receiving, by one or more computer systems, a request for a software system;
   implementing, at least in response to the request, a workflow engine configured to collect configuration information associated with the software system requested, wherein the implementation of the workflow engine is based at least in part on a type associated with the software system requested, the workflow engine executing instructions for:

determining a first configuration question associated with a first subsystem or a second subsystem of the software system based at least in part on historical configuration data;

providing the first configuration question associated with the first subsystem or the second subsystem;

receiving a first response to the first configuration question;

determining, based at least in part on the first response and the historical configuration data, a second configuration question associated with implementing the first subsystem or the second subsystem; and receiving a second response to the second configuration question;

based at least in part on the first response and the second response, obtaining a template that identifies first virtual machine images associated with the first subsystem and second virtual machine images associated with the second subsystem, wherein the template further identifies first configuration instructions associated with the first virtual machine images and second configuration instructions associated with the second virtual machine images;

launching, by the one or more computer systems and based at least in part on the template, first virtual machines that correspond to the first virtual machine images and second virtual machines that correspond to the second virtual machine images, wherein launching the first virtual machines and the second virtual machines includes configuring rules between the first virtual machines and the second virtual machines;

causing, by the one or more computer systems and based at least in part on the template, the first configuration instructions to be executed to configure the first virtual machines; and causing, by the one or more computer systems and based at least in part on the template, the second configuration instructions to be executed to configure the second virtual machines.

2. The computer-implemented method of claim 1, wherein the template further identifies first deployment instructions associated with deploying the first virtual machines and second deployment instructions associated with deploying the second virtual machines.

3. The computer-implemented method of claim 2, wherein the first deployment instructions of the template identify a first application programming interface for deploying the first virtual machines, and wherein the second deployment instructions of the template identify a second application programming interface for deploying the second virtual machines.

4. The computer-implemented method of claim 1, wherein the historical configuration data comprises a set of previously-generated templates.

5. The computer-implemented method of claim 1, wherein the historical configuration data comprises historical user data associated with other software system configurations.

6. A system, comprising:

a processor; and a memory comprising computer-executable instructions that, when executed by the processor, cause the system to:

receive, from a user computing device, a request for a software system;

implement, in response to the request, a workflow engine configured to collect configuration information associated with the software system requested, wherein the implementation of the workflow engine is based at least in part on a type associated with the software system requested, the workflow engine executing instructions to:

determine a first configuration question associated with a first subsystem or a second subsystem of the software system based at least in part on historical configuration data;

provide the first configuration question associated with the first subsystem or the second subsystem;

receive a first response to the first configuration question;

determine, based at least in part on the first response and the historical configuration data, a second configuration question associated with implementing the first subsystem or the second subsystem; and receive a second response to the second configuration question;

based at least in part on the first response and the second response, obtain a template that identifies first virtual machine images associated with the first subsystem and second virtual machine images associated with the second subsystem, wherein the template further identifies first configuration instructions associated with the first virtual machine images and second configuration instructions associated with the second virtual machine images;

launch, based at least in part on the template, first virtual machines that correspond to the first virtual machine images and second virtual machines that correspond to the second virtual machine images, wherein launching the first virtual machines and the second virtual machines includes configuring rules between the first virtual machines and the second virtual machines;

cause, based at least in part on the template, the first configuration instructions to be executed to configure the first virtual machines; and cause, based at least in part on the template, the second configuration instructions to be executed to configure the second virtual machines.

7. The system of claim 6, wherein the first virtual machine images or the second virtual machine images implement a database, an application server, a web server, an identity server, a management server, or a threat protection system.

8. The system of claim 6, wherein the template defines deployment instructions for the first virtual machines and the second virtual machines.

9. The system of claim 6, wherein execution of the computer-executable instructions, further cause the system to:

identify one or more systems running on a user computing device from which the request is received, wherein obtaining the template is further based at least in part on the one or more systems identified as running on the user computing device.

10. The system of claim 6, wherein the template includes instructions for utilizing one or more artifacts, the one or more artifacts comprising at least one of a machine image or a disk volume.

11. The system of claim 6, wherein the first virtual machines and the second virtual machines of the software system are hosted by the system and configured to be deployed on behalf of a user of the user computing device.

12. The system of claim 6, wherein the first virtual machines are configured using a first application programming interface identified in the template, and the second virtual machines are configured using a second application programming interface identified in the template.

13. One or more non-transitory computer-readable media storing computer-executable instructions that, when executed by one or more computer systems, configure the one or more computer systems to perform operations comprising:
    receiving a request for a software system;
    implementing, at least in response to the request, a workflow engine configured to collect configuration information associated with the software system requested, wherein the implementation of the workflow engine is based at least in part on a type associated with the software system requested, the workflow engine executing instructions for:
        determining a first configuration question associated with a first subsystem or a second subsystem of the software system based at least in part on historical configuration data;
        providing the first configuration question associated with the first subsystem or the second subsystem;
        receiving a first response to the first configuration question;
        determining, based at least in part on the first response and the historical configuration data, a second configuration question associated with implementing the first subsystem or the second subsystem; and
        receiving a second response to the second configuration question;
    based at least in part on the first response and the second response, obtaining a template that identifies first virtual machine images associated with the first subsystem and second virtual machine images associated with the second subsystem, wherein the template further identifies first configuration instructions associated with the first virtual machine images and second configuration instructions associated with the second virtual machine images;
    launching, by the one or more computer systems and based at least in part on the template, first virtual machines that correspond to the first virtual machine images and second virtual machines that correspond to the second virtual machine images, wherein launching the first virtual machines and the second virtual machines includes configuring rules between the first virtual machines and the second virtual machines;
    causing, by the one or more computer systems and based at least in part on the template, the first configuration instructions to be executed to configure the first virtual machines; and
    causing, by the one or more computer systems and based at least in part on the template, the second configuration instructions to be executed to configure the second virtual machines.

14. The one or more non-transitory computer-readable media of claim 13, wherein the template further identifies a first application programming interface for configuring the first virtual machines and a second application programming interface for configuring the second virtual machines.

15. The one or more non-transitory computer-readable media of claim 13, wherein the first virtual machines and the second virtual machines individually implement one or more web-based services.

16. The one or more non-transitory computer-readable media of claim 13, wherein obtaining the template comprises generating the template based at least in part on the first response and the second response.

17. The one or more non-transitory computer-readable media of claim 16, wherein the template is generated further based at least in part on historical user input related to configuration of previous software systems of the type associated with the software system requested.

18. The one or more non-transitory computer-readable media of claim 13, wherein the software system comprises a web application software solution, a consumer application software solution, or a business application software solution.

19. The one or more non-transitory computer-readable media of claim 13, wherein the template further identifies first deployment instructions for deploying the first virtual machines and second deployment instructions for deploying the second virtual machines, and wherein executing the computer-executable instructions further configure the one or more computer systems to perform operations comprising:
    deploying the first virtual machines according to the first deployment instructions of the template; and
    deploying the second virtual machines according to the second deployment instructions of the template.

20. The one or more non-transitory computer-readable media of claim 13, wherein configuring the first virtual machines and the second virtual machines comprises implementing a state machine, the state machine being implemented to utilize the template to configure the first virtual machines and the second virtual machines.

* * * * *